(12) United States Patent
Chun et al.

(10) Patent No.: US 12,555,203 B2
(45) Date of Patent: Feb. 17, 2026

(54) ALL-IN-ONE IMAGE QUALITY IMPROVEMENT MODEL PROVIDING METHOD PERFORMING IMAGE QUALITY RESTORATION FOR MULTIPLE IMAGE QUALITY DEGRADATION FACTORS

(71) Applicant: SEOUL NATIONAL UNIVERSITY R&DB FOUNDATION, Seoul (KR)

(72) Inventors: Se Young Chun, Seoul (KR); Dong Won Park, Seoul (KR); Byung Hyun Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 299 days.

(21) Appl. No.: 18/389,908

(22) Filed: Dec. 20, 2023

(65) Prior Publication Data

US 2025/0029214 A1    Jan. 23, 2025

(30) Foreign Application Priority Data

Jul. 17, 2023    (KR) .................. 10-2023-0092339

(51) Int. Cl.
| | |
|---|---|
| G06T 5/70 | (2024.01) |
| G06T 5/20 | (2006.01) |
| G06T 5/73 | (2024.01) |
| G06T 7/00 | (2017.01) |
| G06V 20/70 | (2022.01) |

(52) U.S. Cl.
CPC .................. *G06T 5/70* (2024.01); *G06T 5/20* (2013.01); *G06T 5/73* (2024.01); *G06T 7/0002* (2013.01); *G06V 20/70* (2022.01); *G06T 2207/20081* (2013.01); *G06T 2207/30168* (2013.01)

(58) Field of Classification Search
None
See application file for complete search history.

(56) References Cited

U.S. PATENT DOCUMENTS

2020/0219234 A1*  7/2020  Sotodate ................ H04N 7/183
2022/0386977 A1* 12/2022  Baumgart ............ A61B 6/5258

FOREIGN PATENT DOCUMENTS

| KR | 1020220070864 A | 5/2022 |
| KR | 102483159 B1 | 12/2022 |
| KR | 102493980 B1 | 1/2023 |

* cited by examiner

*Primary Examiner* — Lennin R Rodriguezgonzalez
(74) *Attorney, Agent, or Firm* — Dinsmore & Shohl LLP; Yongsok Choi, Esq.

(57) ABSTRACT

The present disclosure provides an all-in-one image quality improvement model providing method, which restores quality of images degraded due to multiple image quality degradation factors and is performed by a server, including collecting low-quality images of which image quality is degraded due to at least one of the multiple image quality degradation factors and determining an image quality degradation factor that is a cause of image quality degradation of a corresponding image, constructing an integrated restoration network and a single restoration network to restore the low-quality images with respect to the determined image quality degradation factors.

10 Claims, 7 Drawing Sheets

| Added | Added 5% filters | | | | Added 3% filters | | | | Added 1% filters | | | | Base |
|---|---|---|---|---|---|---|---|---|---|---|---|---|---|
| Task | Ran | En | [θ] | Ours | Ran | En | [θ] | Ours | Ran | En | [θ] | Ours | UM |
| Rain | 32.23 | 32.45 | 32.60 | 32.80 | 32.19 | 32.44 | 32.52 | 32.74 | 32.15 | 32.35 | 32.37 | 32.56 | 32.12 |
| Blur | 26.81 | 26.85 | 27.22 | 27.70 | 26.74 | 26.85 | 27.06 | 27.57 | 26.65 | 26.77 | 26.85 | 27.28 | 26.61 |
| Noise | 31.04 | 31.25 | 31.32 | 31.46 | 31.01 | 31.24 | 31.26 | 31.42 | 30.98 | 31.17 | 31.14 | 31.30 | 30.97 |
| Avg. | 30.03 | 30.18 | 30.38 | 30.65 | 29.98 | 30.17 | 30.28 | 30.58 | 29.93 | 30.10 | 30.12 | 30.38 | 29.90 |
| Par. | 33.0M = 28.7M x 1.15 | | | | 31.3M = 28.7M x 1.09 | | | | 29.6M = 28.7M x 1.03 | | | | 28.7 |

ALL-IN-ONE IMAGE QUALITY IMPROVEMENT MODEL PROVIDING METHOD PERFORMING IMAGE QUALITY RESTORATION FOR MULTIPLE IMAGE QUALITY DEGRADATION FACTORS

CROSS-REFERENCE TO RELATED APPLICATION

This application is based on and claims priority under 35 U.S.C. § 119 to Korean Patent Application No. 10-2023-0092339, filed on Jul. 17, 2023, in the Korean Intellectual Property Office, the disclosure of which is incorporated by reference herein in its entirety.

BACKGROUND

The present disclosure relates to an all-in-one image quality improvement model providing method that performs restoration of image quality for multiple image quality degradation factors, and more specifically, to a method of providing a certain level of image quality improvement for multiple image quality degradation factors without distinguishing the type of image quality degradation factors and a system therefor.

Recently, research and development on machine learning-based image quality improvement models have been actively performed. As a result, various models that demonstrate better performance than existing image quality improvement methods have been developed, and the models are already applied to various products, such as smartphones, televisions, or cameras, and are expected to be used in a wide fields in the future.

In this regard, the deep learning model that has recently been used in image quality improvement models is limited to only well-known single degradation cases and factors, and accordingly, there is a problem that the deep learning model may not reflect unpredictable real-world environments and various types of multiple degradation situations.

Also, as the image quality degradation factors for a specific image are diverse, when a model is generated for each of different image quality degradation factors, not only the model has limitation of being applicable only to the well-known multi-exacerbation situations described above, but also the model requires a large amount of network parameters and computations.

Therefore, there is a need to develop an all-in-one image quality improvement model that may respond to multiple image quality degradation factors with one model.

SUMMARY

The present disclosure provides an all-in-one image quality improvement model that restores quality of images degraded due to multiple image quality degradation factors.

Also, the present disclosure provides an all-in-one image quality improvement model that achieves a certain level or more of image quality even with limited resources.

Objects to be solved by the present disclosure are not limited to the objects described above, and other objects not described may be clearly understood from descriptions below.

According to an aspect of the present disclosure, an all-in-one image quality improvement model providing method, which restores quality of images degraded due to multiple image quality degradation factors and is performed by a server, includes collecting low-quality images of which image quality is degraded due to at least one of the multiple image quality degradation factors and determining an image quality degradation factor that is a cause of image quality degradation of a corresponding image, constructing an integrated restoration network and a single restoration network to restore the low-quality images with respect to the determined image quality degradation factors, according to a preset image quality restoration technique for each of the multiple image quality degradation factors, extracting a core network kernel from each single restoration network kernel by restoring the low-quality images by using the integrated restoration network and the single restoration network and comparing restored images, generating an all-in-one image quality improvement model including the integrated restoration network and the learned core network kernel by performing machine learning on the integrated restoration network and the core network kernel with training data, and determining an image quality degradation factor of an input image when a certain image is input from a user terminal, inputting the determined image quality degradation factor to the all-in-one image quality improvement model, and outputting an image with improved image quality.

Also, the single restoration network kernel may be a medium for performing image convolution between the input image and the output image.

Also, the multiple image quality degradation factors may include blur, rain, snow, haze, and noise, and when the low-quality images are input from the user terminal, the quality degradation factors may be labeled and input for each of the low-quality images.

Also, in the collecting of the low-quality images and the determining of the image quality, a received low-quality image may be input to the all-in-one image quality improvement model and a cause of the image quality degradation of the low-quality images may be output as one of blur, rain, snow, haze, and noise, based on an image quality degradation cause classification model previously learned according to a deep learning technique prior to the collecting of the low-quality images and the determining of the image quality.

Also, in the constructing of the integrated restoration network and the single restoration network, the single restoration network may include multiple models including a blur removal model, a rain removal model, a snow removal model, a haze removal model, and a noise removal model, and perform image quality restoration by using one of the multiple models according to the determined image quality degradation factor, the integrated restoration network may be a technique capable of performing the image quality restoration corresponding to the multiple image quality degradation factors, and the single restoration network may be a technique capable of performing the image quality restoration only corresponding to any one image quality degradation factor.

Also, the extracting of the core network kernels may include calculating an integrated gradient value of a filter unit between a network kernel of the integrated restoration network and a network kernel of the single restoration network, and calculating a network kernel of which integrated gradient value is more than a preset percentage as a core network kernel of each single restoration network based on the calculated integrated gradient value of a filter unit.

Also, in the generating of the all-in-one image quality improvement model, the all-in-one image quality improvement model is generated which improves quality of the low-quality images by performing new machine learning by using only a corresponding kernel as training data by utilizing coordinate values of the integrated restoration network and the single restoration network kernel.

Also, the all-in-one image quality improvement model further include extracting the core network kernel by comparing a network kernel of the all-in-one image quality improvement model and a network kernel of the single restoration network, and further training the extracted core network kernel by using the training data.

In addition, an providing sever that all-in-one image quality improvement model, according to an embodiment of the present disclosure includes a memory storing a program for performing a method for providing all-in-one image quality improvement model; and a processor for executing the program, in which the method may include restores quality of images degraded due to multiple image quality degradation factors, includes collecting low-quality images of which image quality is degraded due to at least one of the multiple image quality degradation factors and determining an image quality degradation factor that is a cause of image quality degradation of a corresponding image, constructing an integrated restoration network and a single restoration network to restore the low-quality images with respect to the determined image quality degradation factors, according to a preset image quality restoration technique for each of the multiple image quality degradation factors, extracting a core network kernel from each single restoration network kernel by restoring the low-quality images by using the integrated restoration network and the single restoration network and comparing restored images, generating an all-in-one image quality improvement model including the integrated restoration network and the learned core network kernel by performing machine learning on the integrated restoration network and the core network kernel with training data, and determining an image quality degradation factor of an input image when a certain image is input from a user terminal, inputting the determined image quality degradation factor to the all-in-one image quality improvement model, and outputting an image with improved image quality.

The present disclosure provides an all-in-one image quality improvement model that restores image quality of images degraded due to multiple image quality degradation factors, and thus, a certain level or more of image quality improvement may be achieved even with limited resources.

In addition, the present disclosure provides an image quality improvement model that may respond to all types of image quality degradation occurring due to various causes, thereby responding to various environmental variables that may occur during image capture or transmission.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the present disclosure will be described in detail such that those skilled in the art to which the present disclosure belongs may easily implement the present disclosure with reference to the accompanying drawings. However, the present disclosure may be implemented in many different forms and is not limited to the embodiments to be described herein. In addition, in order to clearly describe the present disclosure with reference to the drawings, portions irrelevant to the description are omitted, and similar reference numerals are attached to similar portions throughout the specification.

Throughout the present specification, when a portion is described to be "connected" to another portion, this includes not only a case where the portion is "directly connected" thereto, but also a case where the portion is "electrically connected" thereto with another element therebetween. In addition, when a certain portion is described to "include" a certain component, this means that the certain portion may further include other components without excluding other components unless otherwise stated.

In the present disclosure, a "portion" includes a unit realized by hardware, a unit realized by software, and a unit realized by using both. In addition, one unit may be realized by using two or more pieces of hardware, and two or more units may be realized by using one piece of hardware. Meanwhile, a "~ portion" is not limited to software or hardware, and a "~ portion" may be configured to be included in an addressable storage medium or may be configured to reproduce one or more processors. Therefore, in one example, "~ portion" refers to components, such as software components, object-oriented software components, class components, and task components, and includes processes, functions, properties, and procedures, subroutines, segments of program code, drivers, firmware, microcode, circuits, data, databases, data structures, tables, arrays, and variables. The functions provided within the components and "portions" may be combined into a smaller number of components and "portions" or may be further separated into additional components and "portions". Additionally, components and "portions" may be implemented to refresh one or more central processing units (CPUs) within the device.

A "terminal" to be described below may be implemented by a computer or a portable terminal capable of accessing a server or another terminal through a network. Here, the computer may include, for example, a notebook computer in which a web browser is stored, a desktop computer, a laptop computer, a virtual reality head mounted display VR HMD (for example, HTC VIVE, Oculus Rift, GearVR, DayDream, PSVR, and so on), and so on. Here, the VR HMD includes a VR HMD for a personal computer (PC) (for example, HTC VIVE, Oculus Rift, FOVE, Deepon, or so on) and VR HMD for mobile terminal (for example, GearVR, DayDream, Stormtrooper, Google Cardboard, or so on), a standalone model that are independently implemented of VR HMD for console (PSVR) (for example, Deepon, PICO, or so on), and so on The portable terminal is, for example, a wireless communication device that ensures portability and mobility, and includes not only a smartphone, a tablet PC, and a wearable device, but also various devices equipped with communication modules, such as a Bluetooth (Bluetooth low energy (BLE)) module, a near field communication (NFC) module, a radio frequency identification (RFID) module, and an ultrasonic module, an infrared module, a Wi-Fi module, and a LiFi module. In addition, the "network" refers to a connection structure capable of exchanging information between nodes, such as a terminal and a server and includes a local area network (LAN), a wide area network (WAN), the Internet (WWW: World Wide Web), a wired and wireless data communications network, a telephone network, a wired and wireless television communication network, and so on. For example, the wireless data communication network includes third generation (3G), fourth generation (4G), fifth generation (5G), third generation partnership project (3GPP), long term evolution (LTE), world interoperability for microwave access (WIMAX), Wi-Fi, Bluetooth communication, infrared communication, ultrasonic communication, visible light communication (VLC), LiFi, and so on but are not limited thereto.

The present disclosure provides an all-in-one image quality improvement model that restores image quality of images degraded due to multiple image quality degradation factors, thereby achieving a certain level or more of image quality improvement even with limited resources, and may respond to all types of image quality degradation occurring due to various causes, thereby responding to various environmental variables that may occur during image capture or transmission.

Figure 1:
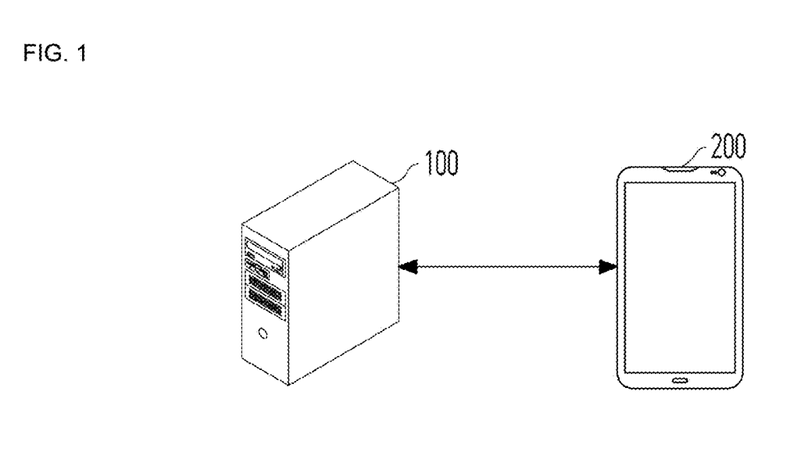
FIG. 1 is a structural diagram of an all-in-one image quality improvement system that performs restoration of image quality for multiple image quality degradation factors, according to an embodiment of the present disclosure.

To this end, an all-in-one image quality improvement model providing system that performs restoration of image quality for multiple image quality degradation factors, according to an embodiment of the present disclosure may be configured as illustrated in FIG. 1.

In the present embodiment, a system includes a server 100 and a user terminal 200, and may further include additional components, such as an input/output device, an administrator terminal, a relay server, and a learning server, according to various embodiments.

Here, the user terminal 200 may be connected wired or wirelessly to the server 100 to communicate therewith and may include a smartphone, tablet personal computer (PC), a laptop computer, or a desktop computer.

Figure 2:
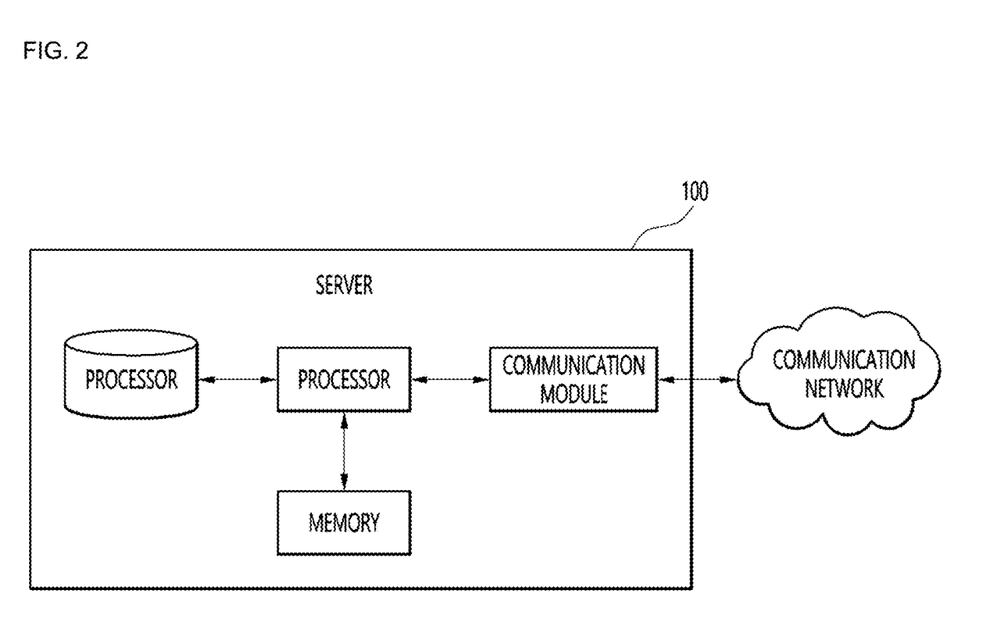
FIG. 2 is a block diagram illustrating an internal configuration of an all-in-one image quality improvement server that performs restoration of image quality for multiple image quality degradation factors, according to an embodiment of the present disclosure.

Referring to FIG. 2, the server 100 according to an embodiment of the present disclosure may include a memory storing a program (or an application) for performing an all-in-one image quality improvement model providing method that restores image quality for multiple image quality degradation factors and a processor that executes the program.

Here, the processor may perform various functions according to execution of the program stored in the memory, and various functions performed by the processor, that is, the server 100, are described in detail below.

First, the server 100 may collect a low-quality image with image quality that is degraded due to one of multiple image quality degradation factors, that is, an original image to be restored and determine the cause of image quality degradation (damage) of a corresponding image.

In this case, a method by which the server 100 collects images with degraded quality may include an input from the user terminal 200, collection of multiple images searched with keywords related to degradation of image quality, damage, or damage through Internet crawling, retrieval of training images (typically images labeled with quality degradation factors) according to various machine learning methods (for example, supervised or unsupervised learning), and an input from the user terminal 200.

For the low-quality images collected in this way, the server 100 may input the received low-quality images into an image quality degradation cause classification model, based on an image quality degradation cause classification model that is previously learned according to a deep learning technique before the corresponding image is collected and may output an image quality degradation cause as one of blur, rain, snow, haze, and noise, thereby determining the image quality degradation cause.

In the present disclosure, image quality degradation factors that cause damage to images typically include blur, rain, snow, haze, and noise, and may further include brightness of lighting, image quality degradation occurring during image editing, dust, and smoke according to various embodiments.

The image quality degradation factors are classified into factors with similar principles to be utilized and factors with different principles when an image quality improvement operation is performed, and representatively, rain, snow, and haze are factors with similar principles, and equations used to improve image quality are also similar or identical to each other, but rain, blur, and noise are factors with different principles, and accordingly, the equations that are used may be set differently.

Also, when a corresponding image is input from the user terminal 200, the collected low-quality images may be used as training data in machine learning by labeling and inputting the low-quality images output for each low-quality image.

In addition, according to another embodiment of the present disclosure, the degradation factors may also be implemented in different forms according to various machine learning methods without being labeled and input.

Figure 3:
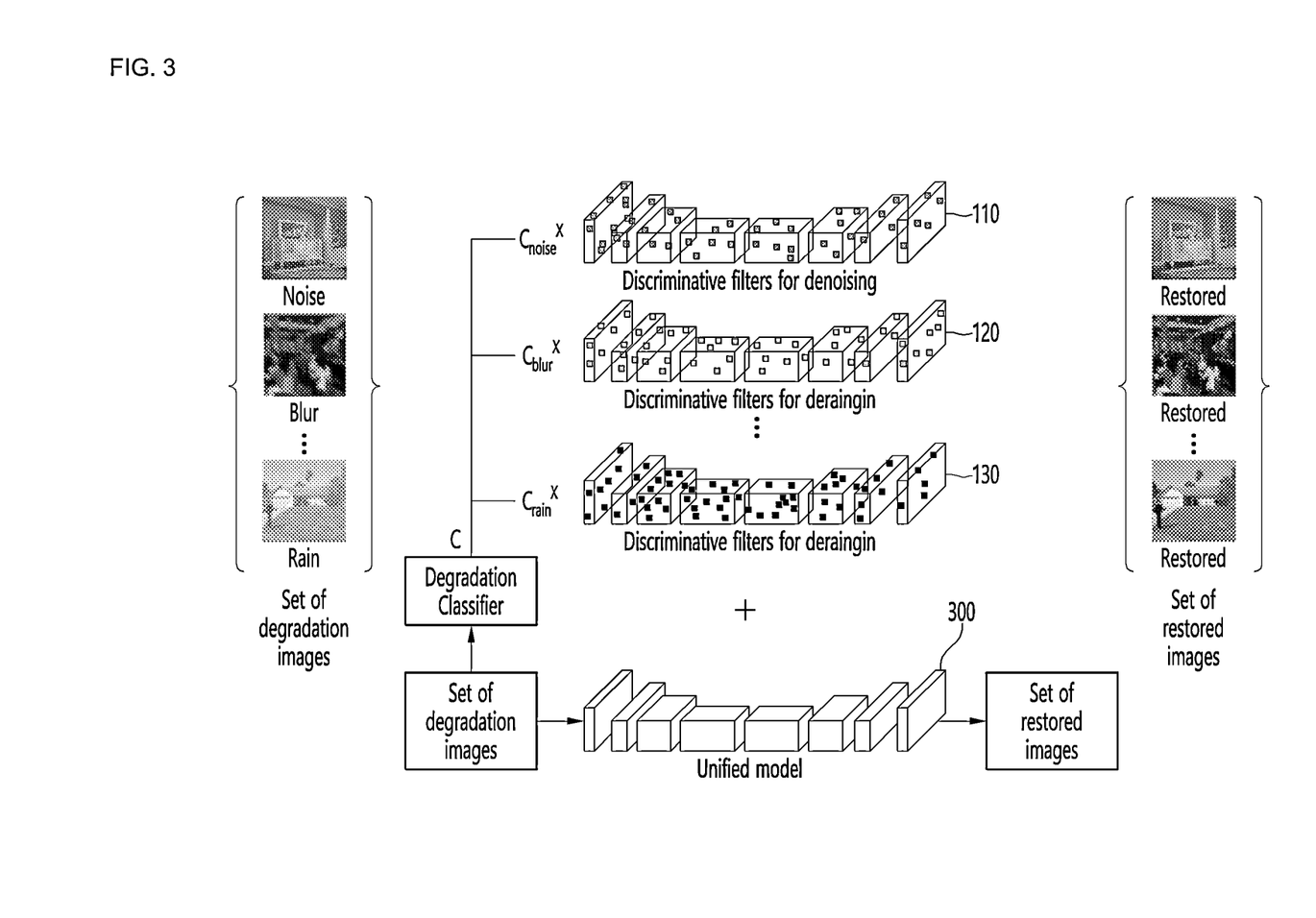
FIG. 3 is a conceptual diagram of an all-in-one image quality improvement model providing method that performs restoration of image quality for multiple image quality degradation factors, according to an embodiment of the present disclosure.

Referring to FIG. 3, the server 100 according to the embodiment of the present disclosure establishes an integrated restoration network and a single restoration network that restore a low-quality image for the determined image quality degradation factors according to a preset image quality restoration technique for each of the multiple image quality degradation factors.

Here, according to another embodiment of the present disclosure, an image quality restoration technique that may be used in the present disclosure may include not only an image quality restoration technique for each of the image quality degradation factors described above, but also a sharpening technique that improves image quality by making the image quality clearer, a color correction technique that improves image quality by improving the color of an image, and a contrast adjustment technique that improves image quality by adjusting the brightness and darkness of an image, and may also include representative techniques used for image quality restoration according to various embodiments.

The preset image quality restoration technique may be performed by the integrated restoration network and single restoration network constructed as described above, where the single restoration network representatively includes a noise removal model 110, a blur removal model 120, a rain removal model 130, a snow removal model, and haze removal model, and each degraded image is restored by one of multiple models, that is, a model most suitable for restoring image quality, according to the determined image quality degradation factors.

On the other hand, the integrated restoration network restores quality of an image corresponding to a corresponding degraded factor among multiple image quality degradation factors not one image quality degradation factor, in other words, according to the embodiment of the present disclosure, the integrated restoration network is a technique that performs image quality restoration, and the single restoration network is a technique that performs image quality restoration only for one image quality degradation factor, and accordingly, the integrated restoration network may have slightly lower image quality restoration compared to the single restoration network but have an advantage of being able to respond to various image quality degradation factors with a single network.

In the present disclosure, the integrated restoration network and the single restoration network may include machine learning models, techniques, or algorithms, programs, or applications that perform the techniques, and may be implemented in various forms to perform image quality restoration according to various embodiments.

Also, the network described in the present disclosure may perform a restoration function by being connected wired or wirelessly to at least one or more of a unit, a device, or a machine learning model for performing image quality restoration.

A result of the image quality restoration performed as described above includes restored images and respective network kernels, and the server 100 compares the image or network kernels to each other to extract a core network kernel 101.

In this case, according to a preferred embodiment, the comparison between images or network kernels may be performed by comparing the amount of change in the network kernel.

Here, the network kernel according to an embodiment of the present disclosure may be a medium for performing image convolution between an input image and an output image.

The network kernel may be implemented in various embodiments but may be utilized to calculate an integrated gradient of a filter unit between the integrated restoration network and each single restoration network according to one embodiment to calculate the core network kernel 101 of each single restoration network, and hereinafter, descriptions are made by assuming that the embodiments are applied.

Figure 4:
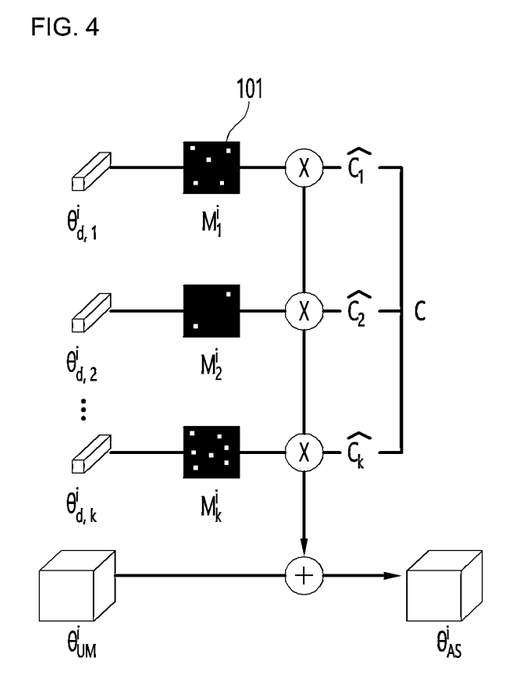
FIG. 4 is an example diagram of a network kernel and a model for each of multiple image quality degradation factors, according to an embodiment of the present disclosure.

Referring to FIG. 4, in the calculation of the network kernel, the server 100 may calculate an integral gradient value of a filter unit used to restore each image by performing convolution of an image restored by the integrated restoration network and an image restored by each single restoration network, and calculate a network kernel of a single restoration network of which value is more than a preset percentage as the core network kernel 101, based on the calculated integral gradient value.

Here, the convolution means an operation to obtain a new function by multiplying values obtained by inverting one function and another function and then integrating on a section, which corresponds to the known technique and is not described in detail in the present disclosure.

Figure 5:
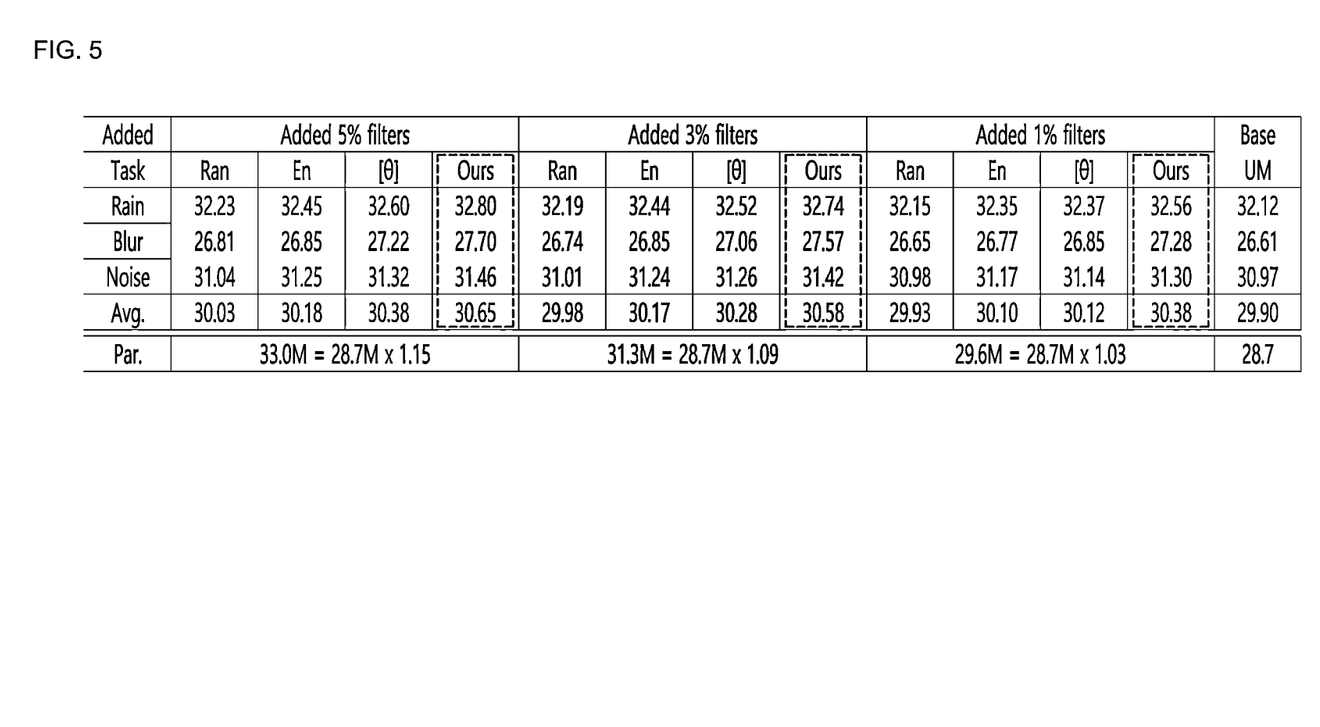
FIG. 5 illustrates experimental data on image quality improvement indices of an all-in-one image quality improvement model and a model for each of multiple image quality degradation factors, according to an embodiment of the present disclosure.

This core network kernel 101 is a factor used as an important indicator for improving image quality, and according to an additional embodiment of the present disclosure, as shown in the experimental data table of FIG. 5, the core network kernel 101 may be randomly set to what percentage of the total images are calculated as the core network kernel 101 according to various embodiments.

For example, 5%, 3%, and 1% of the total images may each be set to be calculated as the core network kernel 101, and the core network kernel 101 may be set whether to select a candidate group randomly, or select the candidate group at an encoder stage, that is, only at the front of a model, or select through comparison between a unified model (UM) and an independent model (IM), and the core network kernel 101 may be calculated through an all-in-one image quality improvement model (Ours) 300 of the present disclosure.

In the illustrated table, an experiment was conducted to compare the setting described above with a calculation method using the all-in-one image quality improvement model 300, and as a result, the greater the calculation percentage of the core network kernel 101, the more effective the improvement, but the present disclosure has a certain level of improvement even when the model size is smaller (low percentage), as illustrated.

In this case, according to an additional embodiment of the present disclosure, a vector value of a low-quality image may include a coordinate value of a region within the low-quality image corresponding to a corresponding vector value.

In other words, in the calculation of the core network kernel 101 according to an embodiment of the present disclosure, a portion where a difference between two network kernels (network kernels of the integrated restoration network and the single restoration network) is most noticeable may be identified as one region (coordinate value) within an image.

According to an embodiment of the present disclosure, the integrated restoration network and the single restoration network perform restoration performs restoration (improvement of image quality) of the same purpose, but because performers are different from each other, it is obvious that there are some differences, and among the differences, it can be seen that the portion (a portion belonging to the above-described percentage) where the difference is most noticeable, and the present disclosure may use this portion to perform more efficient restoration (improvement of image quality) in the manner to be described below.

To this end, the server 100 performs machine learning by using the core network kernel 101 of the integrated restoration network and the single restoration network as training data, thereby, generating an all-in-one image quality improvement model 300.

In this case, a machine learning method may include various learning methods including supervised learning and unsupervised learning, and representatively include a recurrent neural network (RNN), a convolution neural network (CNN) and an artificial neural network (ANN), and so on.

Because the above machine learning method corresponds to the known method, the description on the corresponding portion may be replaced.

The all-in-one image quality improvement model 300 generated as described above may utilize coordinate values of network kernels of the integrated restoration network and the single restoration network to perform new machine learning by using only the corresponding kernel as training data to improve image quality for multiple degradations.

The all-in-one image quality improvement model 300 according to an embodiment of the present disclosure determines image degradation factors of an input image when a certain image, that is, a low-quality image, is input from the user terminal 200, and inputs the determined factors again and performs image quality improvement within a preset range from a preset region (based on coordinate values) corresponding to the core network kernel 101 by using the integrated restoration network and the core network kernel 101 and may output images with improved quality.

In other words, the all-in-one image quality improvement model 300 of the present disclosure performs intensive image quality improvement on a region that needs to be improved for each type of damage based on the extracted network kernel and further provides a small amount of resources (in this case, network parameters) into a region where image quality is severely damaged when compared to the original, and thus, it is possible to obtain significantly improved image quality compared to further providing little resources.

In addition, because the all-in-one image quality improvement model 300 of the present disclosure is learned based on the network kernel of the integrated restoration network, a restoration operation is also performed on an image region for the remaining coordinates that do not correspond to the core network kernel 101, and accordingly, a certain level of image quality improvement may be achieved through selection and concentration of all low-quality images.

The all-in-one image quality improvement model 300 of the present disclosure may be implemented according to various embodiments, and may include an integrated restoration network and a trained core network kernel according to a preferred embodiment.

Figure 6:
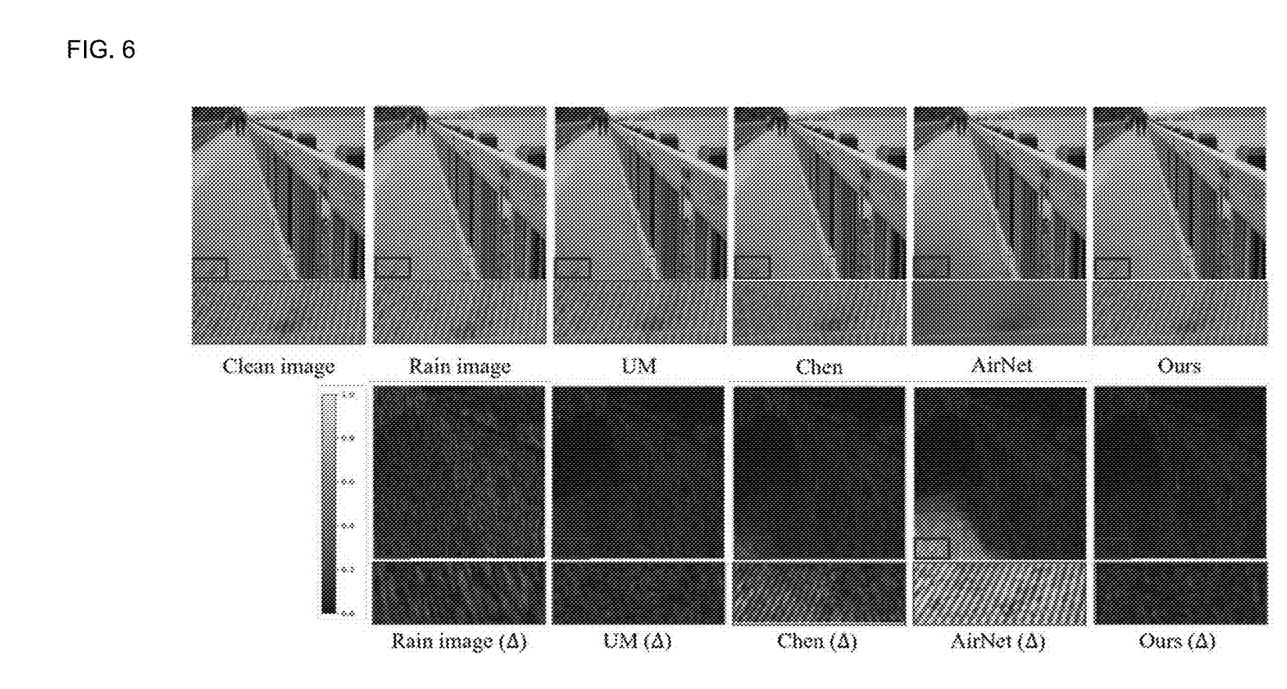
FIG. 6 illustrates example views of a region corresponding to a network kernel, according to an embodiment of the present disclosure.

Referring to FIG. 6, the all-in-one image quality improvement model 300 according to an embodiment of the present disclosure may provide a similar level of image quality improvement as illustrated in FIG. 6 when compared to the image quality improvement achieved by the previously used models, such as UM, Chen, and AirNet.

Also, portions marked in red in FIG. 6 represent the core network kernel 101 and regions in a corresponding image, and it can be seen from the corresponding portions that restoration is made up to a level close to an undamaged clean image.

In addition, when looking at portions (in this case, raindrops) illustrating only the image quality degradation factors in respective images illustrated at the bottom of FIG. 6, it can be seen that raindrop images in regions where the image quality degradation factors appear and regions corresponding to the core network kernels 101 are almost identical to each other.

Therefore, the present disclosure may provide image quality improvement of a similar quality when compared to other models by performing intensive image quality improvement operations on the corresponding portions.

Figure 7:
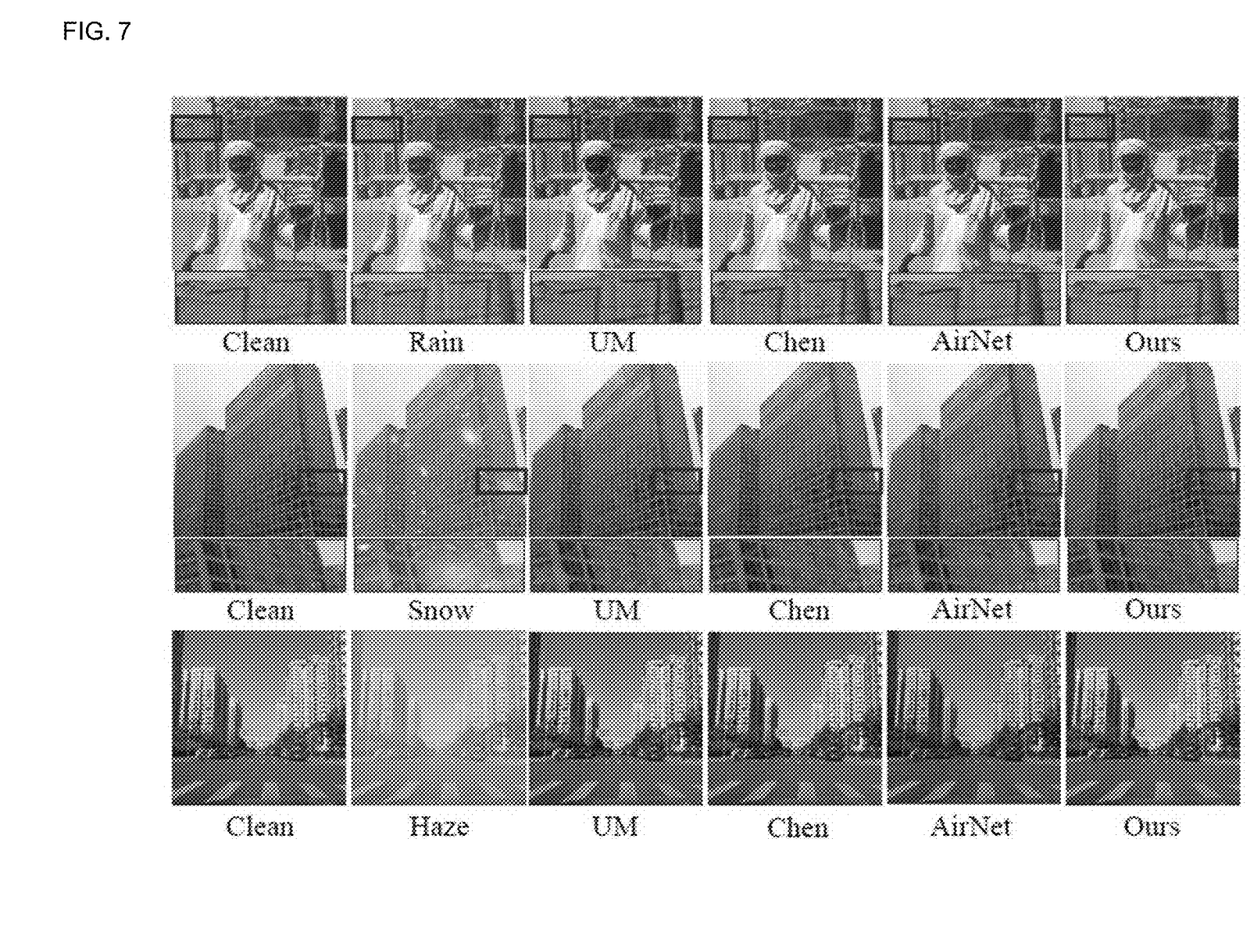
FIG. 7 illustrates example views of image quality improvement results for each of multiple models, according to an embodiment of the present disclosure.

Likewise, as illustrated in FIG. 7, in addition to rainy weather in the present disclosure, image quality degradation due to snow and haze may also be restored with a significant level of quality.

In addition, according to an additional embodiment of the present disclosure, the server 100 may compare a restored image that is a result of quality improvement of multiple image, that is, an output image of which image quality is improved by the all-in-one image quality improvement model 300 with respective network kernels constituting the integrated restoration model and single restoration model described above, extract a separate core network kernel 101 again, and perform additional learning by using the newly extracted core network kernel 101 as training data.

Through this, the present disclosure may continuously supplement a corresponding model by performing an image quality restoration operation and simultaneously reflecting the data generated during the image quality restoration operation in the model.

Figure 8:
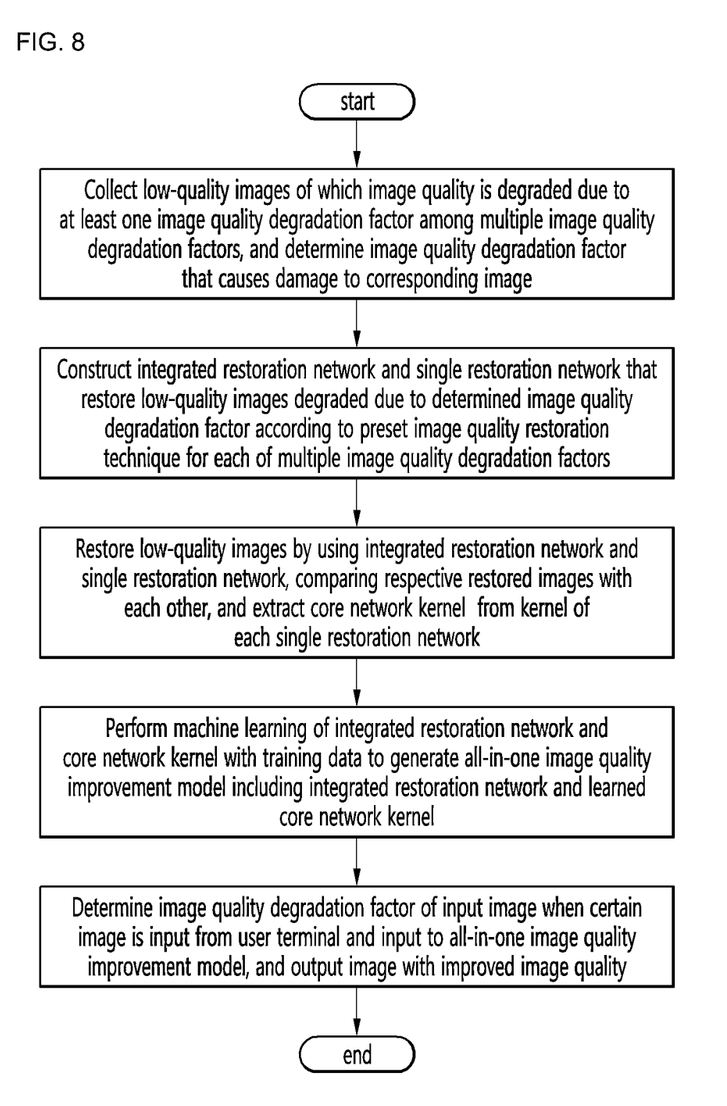
FIG. 8 is a flowchart illustrating a sequence of an all-in-one image quality improvement model providing method that performs restoration of image quality for multiple image quality degradation factors, according to an embodiment of the present disclosure.

Hereinafter, a sequence of an all-in-one image quality improvement model providing method that performs image quality restoration for multiple image quality degradation factors, according to an embodiment of the present disclosure, is described with reference to FIG. 8.

First, the server 100 collects low-quality images of which image quality is degraded due to at least one image quality degradation factor among multiple image quality degradation factors, and determines the image quality degradation factor that causes damage to an image (S101).

An integrated restoration network and a single restoration network are constructed to restore the low-quality images degraded due to the image quality degradation factor determined in this way, according to a preset image quality restoration technique for each of the multiple image quality degradation factors (S102).

The low-quality images are restored by the constructed integrated restoration network and the constructed single restoration network, and by comparing the respective restored images with each other, the core network kernel 101 is extracted from a kernel of each single restoration network (S103).

Next, machine learning is performed by the core network kernels 101 of the integrated restoration network and the single restoration network to generate the all-in-one image quality improvement model 300 including the integrated restoration network and the learned core network kernel (S104).

Thereafter, when a certain image is input from the user terminal 200, an image quality degradation factor of the input image is determined, the determined image quality degradation factor is input to the all-in-one image quality improvement model 300, and an image with improved image quality is output (S105).

One embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium and a communication medium. A computer storage medium includes both volatile and nonvolatile media and removable and non-removable media implemented by any method or technology for storing information, such as computer readable instructions, data structures, program modules or other data.

Although the method and systems of the present disclosure are described with reference to specific embodiments, some or all of their components or operations may be implemented by using a computer system having a general-purpose hardware architecture.

The above description of the present disclosure is for illustrative purposes, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and likewise, components described as distributed may be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. An all-in-one image quality improvement model providing method that restores quality of images degraded due to multiple image quality degradation factors and is performed by a server, the all-in-one image quality improvement model providing method comprising:

collecting low-quality images of which image quality is degraded due to at least one of the multiple image quality degradation factors and determining an image quality degradation factor that is a cause of image quality degradation of a corresponding image;

constructing an integrated restoration network and a single restoration network to restore the low-quality images with respect to the determined image quality degradation factors, according to a preset image quality restoration technique for each of the multiple image quality degradation factors;

extracting a core network kernel from each single restoration network kernel by restoring the low-quality images by using the integrated restoration network and the single restoration network and comparing restored images;

generating an all-in-one image quality improvement model including the integrated restoration network and the core network kernel by performing machine learning on the integrated restoration network and the core network kernel with training data; and determining an image quality degradation factor of an input image when a certain image is input from a user terminal, inputting the determined image quality degradation factor to the all-in-one image quality improvement model, and outputting an image with improved image quality.

2. The all-in-one image quality improvement model providing method of claim 1, wherein
the single restoration network kernel is a medium for performing image convolution between the input image and the output image.

3. The all-in-one image quality improvement model providing method of claim 1, wherein
the multiple image quality degradation factors include blur, rain, snow, haze, and noise, and when the low-quality images are input from the user terminal, the quality degradation factors are labeled and input for each of the low-quality images.

4. The all-in-one image quality improvement model providing method of claim 1, wherein,
in the collecting of the low-quality images and the determining of the image quality, a received low-quality image is input to the all-in-one image quality improvement model and a cause of the image quality degradation of the low-quality images is output as one of blur, rain, snow, haze, and noise, based on an image quality degradation cause classification model previously learned according to a deep learning technique prior to the collecting of the low-quality images and the determining of the image quality.

5. The all-in-one image quality improvement model providing method of claim 1, wherein, in the constructing of the integrated restoration network and the single restoration network,
the single restoration network includes multiple models including a blur removal model, a rain removal model, a snow removal model, a haze removal model, and a noise removal model, and performs image quality restoration by using one of the multiple models according to the determined image quality degradation factor,
the integrated restoration network is a technique capable of performing the image quality restoration corresponding to the multiple image quality degradation factors, and
the single restoration network is a technique capable of performing the image quality restoration only corresponding to any one image quality degradation factor.

6. The all-in-one image quality improvement model providing method of claim 1, wherein the extracting of the core network kernels includes:
calculating an integrated gradient value of a filter unit between a network kernel of the integrated restoration network and a network kernel of the single restoration network; and
calculating a network kernel of which integrated gradient value is more than a preset percentage as a core network kernel of each single restoration network based on the calculated integrated gradient value of a filter unit.

7. The all-in-one image quality improvement model providing method of claim 6, wherein,
in the calculating of the network kernel, a vector value of the low-quality image includes a coordinate value of a region in the low-quality image corresponding to the vector value.

8. The all-in-one image quality improvement model providing method of claim 1, wherein,
in the generating of the all-in-one image quality improvement model, the all-in-one image quality improvement model is generated which improves quality of the low-quality images by performing new machine learning by using only a corresponding kernel as training data by utilizing coordinate values of the integrated restoration network and the single restoration network kernel.

9. The all-in-one image quality improvement model providing method of claim 1, further comprising:
extracting the core network kernel by comparing a network kernel of the all-in-one image quality improvement model and a network kernel of the single restoration network, and further training the extracted core network kernel by using the training data.

10. An all-in-one image quality improvement model providing server that restores quality of images degraded due to multiple image quality degradation factors, the all-in-one image quality improvement model providing server comprising:
a memory storing a program for performing an all-in-one image quality improvement model providing method that restores the quality of the imaged degraded due to the multiple image quality degradation factors; and a processor configured to execute the program, wherein the all-in-one image quality improvement model providing method includes:

collecting low-quality images of which image quality is degraded due to at least one of the multiple image quality degradation factors and determining an image quality degradation factor that is a cause of image quality degradation of a corresponding image;

constructing an integrated restoration network and a single restoration network to restore the low-quality images degraded due to the determined image quality degradation factors, according to a preset image quality restoration technique for each of the multiple image quality degradation factors;

extracting a core network kernel from each single restoration network kernel by restoring the low-quality images by using the integrated restoration network and the single restoration network and comparing restored images;

generating an all-in-one image quality improvement model including the integrated restoration network and the core network kernel by performing machine learning on the integrated restoration network and the core network kernel with training data; and determining an image quality degradation factor of an input image when the input image is input from a user terminal, inputting the determined image quality degradation factor to the all-in-one image quality improvement model, and outputting an image with improved image quality.

\* \* \* \* \*